United States Patent [19]
Murayama et al.

[11] 3,859,293
[45] Jan. 7, 1975

[54] N-SUBSTITUTED SPIRO PIPERIDINE DERIVATIVES

[75] Inventors: Keisuke Murayama; Syoji Morimura; Takao Yoshioka; Toshimasa Toda; Eiko Mori; Hideo Horiuchi; Susumu Higashida; Katsuaki Matsui; Tomoyuki Korumada; Noriyuki Ohta; Hisayou Ohsawa, all of Tokyo, Japan

[73] Assignee: Sankyo Company Limited, Tokyo, Japan

[22] Filed: Sept. 4, 1973

[21] Appl. No.: 393,883

Related U.S. Application Data
[63] Continuation of Ser. No. 229,203, Feb. 24, 1972, abandoned.

[30] Foreign Application Priority Data
Nov. 13, 1971 Japan.............................. 46-90988

[52] U.S. Cl... 260/293.58, 260/45.8 A, 260/45.8 N, 260/45.8 NZ, 260/293.63, 260/293.66
[51] Int. Cl.......................................... C07d 99/04
[58] Field of Search..... 260/293.66, 293.58, 293.63, 260/45.8 N, 45.8 NZ

[56] References Cited
OTHER PUBLICATIONS
Chemical Abstracts 71: 113003n (1969) Deuss et al.

Primary Examiner—Henry R. Jiles
Assistant Examiner—S. D. Winters
Attorney, Agent, or Firm—Toren and McGeady

[57] ABSTRACT

N-Substituted piperidine derivative having the formula

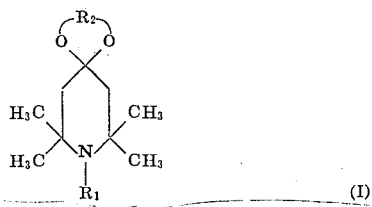
(I)

wherein $R_1$ represents an alkyl group, an alkenyl group, an alkynyl group, an aralkyl group, β-hydroxyethyl group or the group of the formula

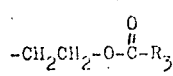

in which $R_3$ represents an alkyl group, an alkenyl group or an aryl group; and $R_2$ represents an alkylene group having two or three carbon atoms, o-phenylene group or the group of the formula

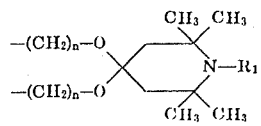

in which $R_1$ is as defined above and $n$ is an integer of 4 through 6 inclusive. Some groups of the derivatives(I) are prepared by reacting piperidine-spro-cyclic ketal derivatives having the formula

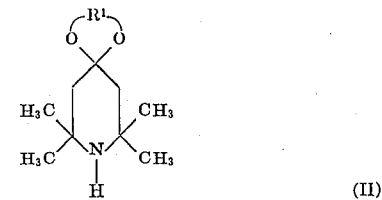
(II)

wherein $R^1$ represents an alkylene group having 2 or 3 carbon atoms, o-phenylene group or the group of the formula

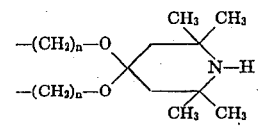

in which $n$ is an integer of 4 through 6 inclusive with (a) halides having the formula $R_4X$ therein $R_4$ represents an alkyl group, an alkenyl group, an alkynyl group or an aralkyl group, (b) sulfates having the formula $(R_6)_2SO_4$ wherein $R_6$ represents an alkyl group or (C) ethylene oxide. Another group of the derivatives (I) is prepared by reacting N-hydroxyethypiperidine derivatives having the formula

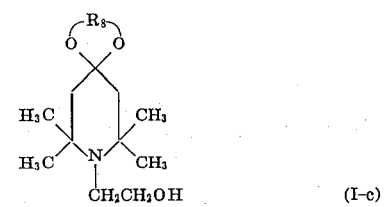
(I-c)

wherein $R_8$ represents an alkylene group having 2 or 3 carbon atoms, o-phenylene group of the formula

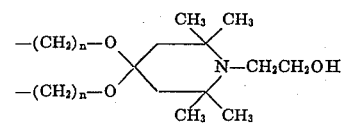

in which $n$ is an integer of 4 through 6 inclusive with acyl halides having the formula

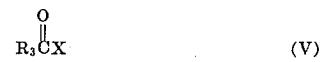
(V)

wherein $R_3$ is as defined above and X represents a halogen atom. They are all useful as a stabilizer against deterioration of various synthetic polymers.

10 Claims, No Drawings

N-SUBSTITUTED SPIRO PIPERIDINE DERIVATIVES

This is a continuation of application Ser. No. 229,203, filed Feb. 24, 1972, of Keisuke Murayama et al., and now abandoned.

This invention relates to new N-substituted piperidine derivatives, their preparation and their use as stabilizers.

More particularly, this invention is concerned with the N-substituted piperidine derivatives having the formula

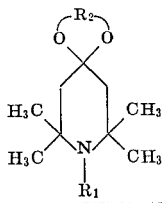

wherein $R_1$ represents an alkyl group, an alkenyl group, an alkynyl group, an aralkyl group, $\beta$-hydroxyethyl group or the group of the formula

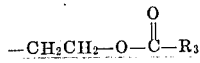

in which $R_3$ represents an alkyl group, an alkenyl group or an aryl group; and $R_2$ represents an alkylene group having 2 or 3 carbon atoms, o-phenylene group or the group of the formula

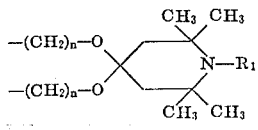

in which $R_1$ is as defined above and $n$ is an integer of 4 through 6 inclusive, a process for the preparation of the N-substituted piperidine derivatives (I) and stabilization of synthetic polymers against photo- and thermal-deterioration thereof by having incorporated therein, in a sufficient amount to prevent such deterioration, at least one of the N-substituted piperidine derivatives (I).

In the above formula (I), the alkyl group may illustratively be those alkyl groups having 1 to 8 carbon atoms, e.g., methyl, ethyl, propyl, butyl, hexyl, heptyl and octyl; the alkenyl group be those alkenyl groups having 3 to 5 carbon atoms, e.g., allyl, 2-butenyl and 2-pentenyl; the alkynyl group be those alkynyl groups having 3 to 5 carbon atoms, e.g., 2-propynyl; the aralkyl group be those aralkyl groups which have 6 to 10 carbon atoms in the aryl moiety and 1 to 3 carbon atoms in the alkyl moiety and optionally, as a substituent in the aryl moiety, such as lower alkyl, e.g., methyl, ethyl and propyl, halogen, e.g., chlorine, bromine and fluorine and the like, for example, benzyl, phenethyl, naphthylmethyl; the aryl group be those aryl groups having 6 to 10 carbon atoms, e.g., phenyl and naphthyl; the alkylene group be ethylene, propylene and trimethylene.

The term "synthetic polymer" as used herein are intended to embrace polyolefins including homopolymers of olefins such as low-density and high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrene-butadiene copolymer, acrylonitrile-butadiene-styrene copolymer and the like;

polyvinyl chlorides and polyvinylidene chlorides including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;

polyacetals such as polyoxymethylene and polyoxyethylene;

polyesters such as polyethylene terephthalate; polyamides such as 6-nylon, 6,6-nylon and 6,10-nylon; and polyurethanes.

Synthetic polymers have been widely utilized in the art, in view of their excellent properties, in various forms or shapes, for example, filament, fibre, yarn, film, sheet, other molded article, latex and foam. However, these polymers have some drawbacks such as poor light- and heat-stabilities and the like. Stated illustratively, polyolefins and polyurethane elastomers frequently tend to undergo severe deterioration when exposed to light such as sunlight or ultraviolet ray, and polyvinyl chloride and polyvinylidene chloride frequently tend to deteriorate and become colored by the action of light and heat together with elimination of hydrogen chloride therefrom. Polyamides are also frequently subjected to photo-deterioration. For the purpose of stabilizing these synthetic polymers against such deterioration, there have heretofore been proposed in the art a number of stabilizers; for example, for polyolefins, benzotriazole compounds and benzophenone compounds; for polyurethanes, phenol compounds and benzophenone compounds; and for polyvinyl chloride and polyvinylidine chloride, lead salts such as basic lead silicate and tribasic lead maleate, and organotin compounds such as dibutyltin laurate and dibutyltin maleate.

Although such prior stabilizers are known to be considerably satisfactory, there still remained some problems to be improved.

Thus, numerous attempts have been made in the art to find and develop new and more effective stabilizers.

As a result of our extensive studies, it has now been found that the new N-substituted piperidine derivatives (I) of this invention can be satisfactorily prepared and exhibit a high stabilizing effect against photo- and thermal-deterioration of the synthetic polymers.

It is, accordingly, an object of this invention to provide new and useful N-substituted piperidine derivatives (I).

Another object is to provide a process for the preparation of the valuable N-substituted piperidine derivatives (I).

Still another object is to provide synthetic polymer composition stabilized against the deterioration thereof by having incorporated therein a sufficient amount to prevent the deterioration of at least one of the N-substituted piperidine derivatives (I).

Other objects of this invention will become apparent to those skilled in the art from the following description.

In one aspect of this invention, the N-substituted piperidine derivatives (I) are all new substances unknown in the art.

The N-substituted piperidine derivatives (I) of this invention include the four groups of N-substituted piperidine compounds having the following formulae (I-a), (I-b), (I-c) and (I-d):

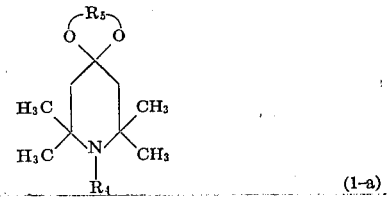

(I-a)

wherein $R_4$ represents an alkyl group, an alkenyl group, an alkynyl group or an aralkyl group; and $R_5$ represents an alkylene group having 2 or 3 carbon atoms, o-phenylene group or the group of the formula

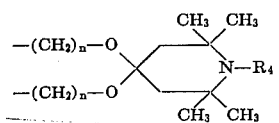

in which $R_4$ is as defined above and $n$ is an integer of 4 through 6 inclusive;

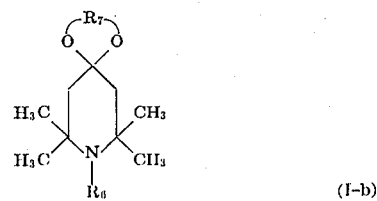

(I-b)

wherein $R_6$ represents an alkyl group; and $R_7$ represents an alkylene group having 2 or 3 carbon atoms, o-phenylene group or the group of the formula

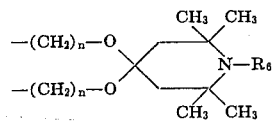

in which $R_6$ is as defined above and n is an integer of 4 through 6 inclusive;

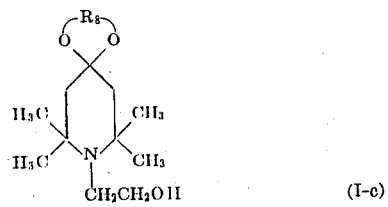

(I-c)

wherein $R_8$ represents an alkylene group having 2 or 3 carbon atoms, o-phenylene group or the group of the formula

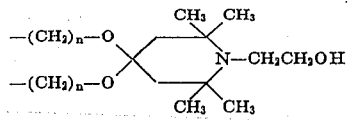

in which $n$ is an integer of 4 through 6 inclusive; and

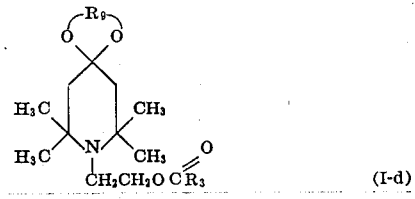

(I-d)

wherein $R_3$ represents an alkyl group, an alkenyl group, or an aryl group; and $R_9$ represents an alkylene group having 2 or 3 carbon atoms, o-phenylene group or the group of the formula

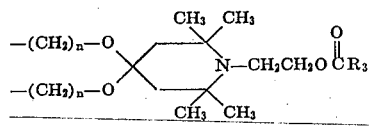

in which $R_3$ is as defined above and n is an integer of 4 through 6 inclusive.

Representative of the N-substituted piperidine compounds of the above-illustrated formulae (I-a), (I-b), (I-c) and (I-d) are as follows:

| Compound | Chemical Name |
|---|---|
| 1 | 8-aza-7,7,8,9,9-pentamethyl-1,4-dioxa-spiro-[4.]decane. |
| 2 | 8-aza-2,7,7,8,9,9-hexamethyl-1,4-dioxa-spiro-[4.5]decane. |
| 3 | 9-aza-8,8,9,10,10-pentamethyl-1,5-dioxa-spiro-[5.5]undecane. |
| 4 | 8-aza-7,7,9,9-tetramethyl-8-octyl-1,4-dioxa-spiro-[4.5]decane. |
| 5 | 8-aza-8-(β-hydroxyethyl)-7,7,9,9-tetramethyl-1,4-dioxa-spiro[4.5]decane. |
| 6 | 8-allyl-8-aza-7,7,9,9-tetramethyl-1,4-dioxa-spiro[4.5]decane. |
| 7 | 8-aza-8-7,7,9,9-tetramethyl-1,4-dioxa-8-(2-propynyl)-spiro[4.5]decane. |
| 8 | 8-aza-8-benzyl-7,7,9,9-tetramethyl-1,4-dioxa-spiro[4.5]decane. |
| 9 | 8-aza-7,7,9,9-tetramethyl-8-(p-methylbenzyl)-1,4-dioxa-spiro[4.5]decane. |
| 10 | 8-(p-chlorobenzyl)-8-aza-7,7,9,9-tetramethyl-1,4-dioxa-spiro[4.5]decane. |
| 11 | 1,2,2,6,6-pentamethyl-4,4-(o-phenylenedioxy)-piperidine. |
| 12 | (1,2,2,6,6-pentamethylpiperidine)-4-spiro-2'-(1',3',10',12'-tetraoxyacycloctadecane)-11'-spiro-4'''-(1''',2''',2''',6''',6'''-pentamethylpiperidine). |
| 13 | 8-(β-acetoxyethyl)-8-aza-7,7,9,9-tetramethyl-1,4-dioxa-spiro[4.5]decane. |
| 14 | 8-aza-8-(β-decanoyloxyethyl)-7,7,9,9-tetramethyl-1,4-dioxa-spiro[4.5]decane. |

| Compound | Chemical Name |
|---|---|
| 15 | 8-(β-acryloxyethyl)-8-aza-7,7,9,9-tetramethyl-1,4-dioxa-spiro[4.5]decane. |
| 16 | 8-aza-8-(β-crotonoyloxyethyl)-7,7,9,9-tetramethyl-1,4-dioxa-spiro[4.5]decane. |
| 17 | 8-aza-8-(β-benzoyloxyethyl)-7,7,9,9-tetramethyl-1,4-dioxa-spiro[4.5]decane. |

In another aspect of this invention, there is provided a process for the preparation of the N-substituted piperidine compounds of the above formula (I).

More specifically, the present process includes four specific embodiments, that is, Process A . . . an embodiment for preparing the N-substituted piperidine compounds (I-a)
Process B . . . an embodiment for preparing the N-substituted piperidine compounds (I-b)
Process C . . . an embodiment for preparing the N-substituted piperidine compounds (I-c)
Process D . . . an embodiment for preparing the N-substituted piperidine compounds (I-d).

The present process as depicted above can be illustrated in the following reaction schema and each embodiment will be fully discussed herein below:

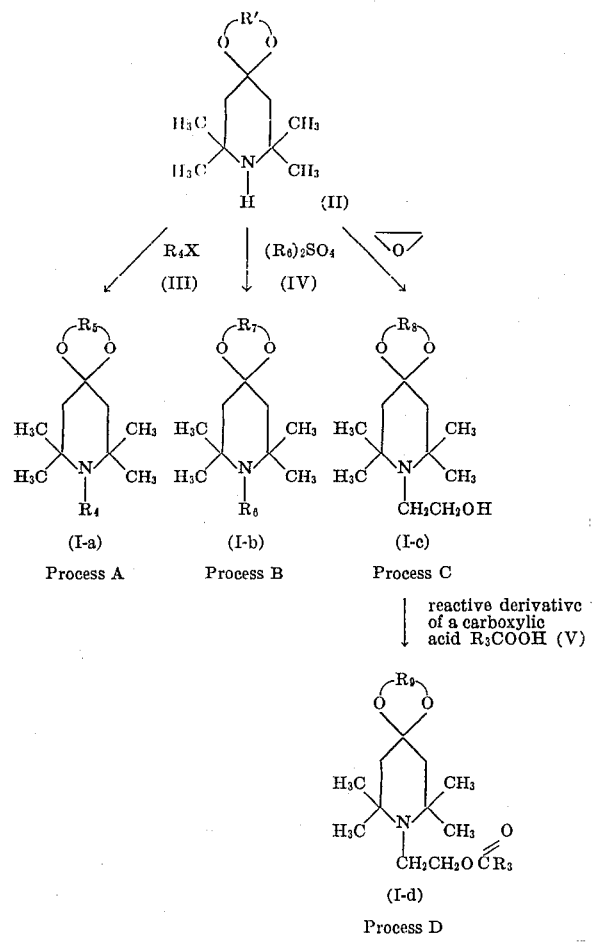

In the above formulae, R' represents an alkylene group having 2 or 3 carbon atoms, o-phenylene group or the group of the formula

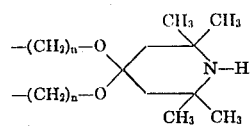

in which $n$ is an integer of 4 through 6 inclusive, X represents a halogen atom and $R_3$, $R_4$, $R_5$, $R_6$, $R_7$, $R_8$ and $R_9$ are as defined above.

Process A

In this embodiment, the N-substituted piperidine compounds of the formula (I-a) are prepared by reacting the peridine-spiro-cyclic ketal derivative (II) with the halide (III). The reaction may be suitably effected in the presence of a non-aqueous organic solvent. Examples of the solvent include aromatic hydrocarbons, e.g., benzene, toluene and xylene. The reaction temperature is not critical in this reaction, but the reaction may be usually and preferably conducted at room temperature or a reflux temperature of the reaction solvent employed. The reaction period is also not critical, but the reaction is usually completed in about 1 hour 3 days. The reaction may be more favourably conducted with the addition of an acid-binding agent to remove an acid formed in situ during the reaction proceeding. Examples of the acid-binding agent include inorganic bases, e.g., sodium carbonate and organic bases having a higher basicity than that of the starting amine (II), e.g., trimethylamine, triethylamine, methylmorpholine and methylpiperidine. After completion of the reaction, the desired product may be easily recovered and purified by a conventional method, for instance, by filtering off a hydrogen halide by-product as a salt of the starting amine (II) or the base incorporated, concentrating the filtrate and recrystallizing the residue from a suitable solvent.

Process B

In this embodiment, the N-substituted piperidine compounds of the formula (I-b) are prepared by reacting the piperidine-spiro-cyclic ketal derivative (II) with the sulfate (IV), preferably in the presence of a solvent and an inorganic base. Examples of the solvent include lower alcohols, e.g., methanol and ethanol; cyclic ethers, e.g., dioxane; cyclic hydrocarbons, e.g., cyclohexane; water; and the mixture thereof. Examples of the inorganic base include sodium hydroxide and potassium hydroxide. The reaction temperature is not critical, but the reaction is usually effected at room temperature or under heating. The reaction period is also not critical, but the reaction is usually completed in about 2 to 6 hours. After completion of the reaction, the desired product may be easily recovered and purified by a conventional method, for instance, by distilling off the solvent, extracting the residue with a suitable organic solvent, e.g., benzene or ether and distilling off the solvent from the extract.

Process C

In this embodiment, the N-substituted piperidine compounds of the formula (I-c) are prepared by reacting the piperidine-spiro-cyclic ketal derivative (II) with ethylene oxide. The reaction may be preferably effected by dissolving the starting material (II) in an organic solvent, adding a small amount of an acid to the resulting solution, incorporating ethylene oxide into the mixture and heating in a sealed reaction vessel. Examples of the organic solvent include lower alcohols, e.g., methanol and ethanol; cyclic ethers, e.g., dioxane; and the like. Examples of the acid include mineral acids, e.g., hydrochloric acid; organic sulfonic acids, e.g., methanesulfonic acid, benzenesulfonic acid and p-toluenesulfonic acid; and the like. The reaction temperature is not critical in this reaction, but the reaction is usually effected at about 50° to 80°C. The reaction period is not also critical, but the reaction is usually completed in about 2 to 6 hours. After completion of the reaction, the desired product may be easily recovered and purified by a conventional method, for instance, by employing the same procedures as set forth in the above Process B.

Process D

In this embodiment, the N-substituted piperidine compounds of the formula (I-d) are prepared by reacting the N-substituted piperidine compounds of the formula (I-c) as prepared in the above Process C with the reactive derivative of the carboxylic acid (V). The reaction in this embodiment is a conventional acylation reaction and the procedures and conditions in this embodiment may be, accordingly, the same as ordinarily available in the art for such a purpose. The reaction may be preferably effected by dissolving the starting material (I-c) in an organic solvent, e.g., benzene, adding an inorganic base, e.g., potassium carbonate and then the reactive derivative to the resulting solution and heating under reflux the resulting mixture with stirring for about 1 to 3 hours. After completion of the reaction, the desired product may be easily recovered and purified by a conventional method, for instance, by washing the reaction mixture with water, drying, distilling off the solvent and recrystallizing the residue from a suitable solvent.

The piperidine-spiro-cyclic ketal derivatives (II) which may be employed as a starting material in the process of this invention are new substances and they may be readily prepared by reacting triacetonamine with a dihydric alcohol or phenol having the formula R'—(OH)$_2$ wherein R' is as defined above in the presence of an acid catalyst, e.g., hydrochloric acid, polyphosphoric acid, methanesulfonic acid, benzenesulfonic acid and p-toluenesulfonic acid (See, our Japanese Patent Application No. 44418/1969, filed on June 6, 1969).

In still another aspect of this invention, there is provided a synthetic polymer composition stabilized against photo- and thermal-deterioration which contains at least one of the new N-substituted piperidine derivatives (I) having incorporated therein.

The N-substituted piperidine derivatives (I) employed as a stabilizer in the present invention may be readily incorporated into the synthetic polymers by any of the various standard procedures commonly utilized in the art. The stabilizer may be incorporated into the synthetic polymers at any desired stage prior to the manufacture of shaped articles therefrom. Thus, for example, the stabilizer in the form of a dry powder may be admixed with the synthetic polymer, or a suspension or emulsion of the stabilizer may be admixed with a solution, suspension or emulsion of the synthetic polymer.

The amount of the N-substituted piperidine derivatives (I) employed in the synthetic polymer in accordance with the present invention may be varied widely, depending upon the types, priperties and particular uses of the synthetic polymer to be stabilized. In general, the N-substituted piperidine derivatives of the formula (I) may be added in an amount ranging from 0.01 to 5.0% by weight, based on the amount of the synthetic polymer, but the practical range is varied depending upon the type of the synthetic polymer, that is 0.01 to 2.0% by weight, preferably 0.02 to 1.0% by weight for polyolefins, 0.01 to 1.0% by weight, preferably 0.02 to 0.5% by weight for polyvinyl chloride and polyvinylidene chloride, and 0.01 to 5.0% by weight, preferably 0.02 to 2.0% by weight for polyurethanes and polyamides.

The present stabilizer may be used alone or in combination with other known antioxidants, ultraviolet absorbents, fillers, pigments and the like.

If desired, two or more of the present stabilizers i.e. the N-substituted piperidine derivatives of the formula (I) may also be satisfactorily used in this invention.

In order that the invention may be better understood, the following Examples are given solely for the purpose of illustration of this invention. In the Examples, all parts are given by weight unless otherwise indicated and the number of the test compound as used hereinbelow is the same as illustratively shown above.

Examples 1 through 11 describe the preparation of new N-substituted piperidine compounds (I) of this invention.

Examples 12 through 17 describe the synthetic polymer composition having incorporated therein the N-substituted piperidine compounds (I) of this invention as well as their stabilizing effects.

Preparations 1 through 3 describe the preparation of the piperidine-spiro-cyclic ketal derivatives (II) which may be employed as a starting material in the process of this invention.

EXAMPLE 1

8-Aza-7,7,8,9,9-pentamethyl-1,4-dioxa-spiro[4.5]decane

A mixture of 40 g. of 8-aza-7,7,9,9-tetramethyl-1,4-dioxa-spiro[4.5]decane and 28.4 g. of methyl iodide was heated under reflux for 1 hour.

After cooling, the reaction mixture was filtered to separate out the hydroiodide crystals precipitated in situ. The crystals were washed with ether.

The ether washings and the filtrate were combined and the resulting mixture was subjected to distillation under reduced pressure to give 15 g. of the desired product as colorless liquid boiling at 90° – 91°C./2 mmHg. The oily liquid thus produced was ice-cooled to give white crystals melting at 35.5° – 36°C.

Analysis for $C_{12}H_{23}NO_2$:
Calculated: C, 67.56%; H, 10.87%; N, 6.45%.
Found: C, 67.20%; H, 10.86%; N, 6.08%.
Mass spectrum:
Calculated molecular weight 213. M$^+$ 213.
NMR spectrum (in CCl$_4$ solution):
τ
6.15 (4H, -CH$_2$- at 2- and 3-positions),
7.77 (3H,

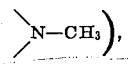

), 8.42 (4H, -CH$_2$- at 6- and 10-positions),
8.89 (12H, -CH$_3$ at 7- and 9-positions).

Following the substantially same procedures as shown above, there was produced 9-aza-8,8,9,10,10-pentamethyl-1,5-dioxa-spiro[5.5]undecane.
bp. 85° – 89°C./2 mmHg.
Analysis for $C_{13}H_{25}NO_2$:
Calculated: C, 68.68%; H, 11.08%; N, 6.16%.
Found: C, 68.51%; H, 10.99%; N, 6.35%.
Mass spectrum:
Calculated molecular weight 227.34. M$^+$ 227.

EXAMPLE 2

8-Aza-2,7,7,8,9,9-hexamethyl-1,4-dioxa-spiro[4.5]decane

A mixture of 15.2 g. of 8-aza-2,7,7,9,9-pentamethyl-1,4-dioxa-spiro[4.5]decane and 20 g. of methyl iodide was allowed to stand overnight and then heated under reflux for 3 hours. After cooling, the reaction mixture was treated in the same manner as shown in the above Example 1 to give 5 g. of the desired product as colorless liquid boiling at 82°C./3 mmHg.

Analysis for $C_{13}H_{25}NO_2$:
  Calculated: C, 68.68%; H, 11.08%; N, 6.16%.
  Found: C, 68.40%; H, 11.21%; N, 6.35%.
NMR spectrum (in $CCl_4$ solution):
τ
  7.78 (3H, singlet,

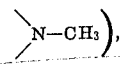), 8.42 (4H, multiplet, —$CH_2$— at 6- and 10-positions),
  8.78 (3H, doublet, J = 6 cps, —$CH_3$ at 2-position),
  8.92 (12H, singlet, —$CH_3$ at 7- and 9-positions)

EXAMPLE 3

8-Aza-7,7,9,9-tetramethyl-8-octyl-1,4-dioxa-spiro[4.5]decane

A mixture of 40 g. of 8-aza-7,7,9,9-tetramethyl-1,4-dioxa-spiro[4.5]decane and 29 g. of octyl bromide was heated at 170° – 180°C. for 8 hours. After cooling, the reaction mixture was treated in the same manner as shown in the above Example 1 to give the desired product as colorless liquid boiling at 161° – 162°C./1 mmHg.

Analysis for $C_{19}H_{37}NO_2$:
  Calculated: C, 73.26%; H, 11.97%; N, 4.50%.
  Found: C, 74.07%; H, 12.16%; N, 4.47%.
Mass spectrum:
  Calculated molecular weight 311. $M^+$ 311.
NMR spectrum (in $CCl_4$ solution):
τ
  7.5 – 7.8 (2H, broad, N—$CH_2$—),
  8.73 (12H, —($CH_2$)$_6$—$CH_3$),
  9.11 (3H, —($CH_2$)$_7$—$CH_3$)

EXAMPLE 4

8-Allyl-8-aza-7,7,9,9-tetramethyl-1,4-dioxa-spiro[4.5]decane

A mixture of 40 g. of 8-aza-7,7,9,9-tetramethyl-1,4-dioxa-spiro[4.5]decane and 24.2 g. of allyl bromide was heated at 85°C. for 6 hours. After cooling, the reaction mixture was treated in the same manner as shown in the above Example 1 to give the desired product as colorless liquid boiling at 126° – 128°C./3 mmHg.

Analysis for $C_{14}H_{25}NO_2$:
  Calculated: C, 70.25%; H, 10.53%; N, 5.85%.
  Found: C, 70.03%; H, 10.61%; N, 5.99%.
Mass spectrum:
  Calculated molecular weight 239. $M^+$ 239.
IR spectrum (liquid film):
  $\nu_{C=C}$ 1643 cm$^{-1}$,
  $\nu_{=CH-CH_2}$ 990, 910 cm$^{-1}$.

EXAMPLE 5

8-Aza-7,7,9,9-tetramethyl-8-(2-propynyl)-1,4-dioxa-spiro[4.5]decane

To a solution of 20 g. of 8-aza-7,7,9,9-tetramethyl-1,4-dioxa-spiro[4.5]decane in 50 ml. of benzene were added 24 g. of propargyl bromide and 15 g. of potassium carbonate and the resulting mixture was heated under reflux with stirring for 1.5 hours.

After cooling, the reaction mixture was filtered and the filtrate was concentrated. The residue was subjected to distillation under reduced pressure to give the desired product as colorless liquid boiling at 104° – 105°C./1 mmHg.

Analysis for $C_{14}H_{23}NO_2$:
  Calculated: C, 70.85%; H, 9.77%; N, 5.90%.
  Found: C, 70.63%; H, 9.89%; N, 5.97%.
IR spectrum (liquid film):
  $\nu_{C\equiv CH}$ 3350 cm$^{-1}$,
  $\nu_{C\equiv C}$ 2110 cm$^{-1}$.
NMR spectrum (in $CCl_4$ solution):
τ
  6.66 (2H,

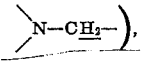), 8.05 (1H, —C≡CH).
Mass spectrum:
  Calculated molecular weight 237. $M^+$ 237.

EXAMPLE 6

8-Aza-8-benzyl-7,7,9,9-tetramethyl-1,4-dioxa-spiro[4.5]decane

A mixture of 40 g. of 8-aza-7,7,9,9-tetramethyl-1,4-dioxa-spiro[4.5]decane and 17.1 g. of benzyl bromide was heated at 110°C. for 7 hours. After cooling, the reaction mixture was treated in the same manner as shown in the above Example 1 to give 29.9 g. of the crystalline residue, which was then recrystallized from petroleum benzine to give the pure desired product as white crystals melting at 101° – 102°C.

Analysis for $C_{18}H_{27}NO_2$:
  Calculated: C, 74.70%; H, 9.40%; N, 4.84%.
  Found: C, 74.67%; H, 9.21%; N, 4.87%.
Mass spectrum:
  Calculated molecular weight 289. $M^+$ 289.
NMR spectrum (in $CCl_4$ solution)
τ
  2.60 – 2.97 (5H, $C_6H_5$—),
  6.15 (6H,

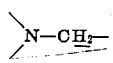

and —$CH_2$— at 2- and 3-positions).

Following the substantially same procedures as shown above, the following compounds were produced:

8-Aza-8-(p-methylbenzyl)-7,7,9,9-tetramethyl-1,4-dioxa-spiro[4.5]decane

White crystals melting at 128° – 129°C. [recrystallization from a mixture of methanol and benzene (3:1)].
Analysis for $C_{19}H_{29}NO_2$:

Calculated: C, 75.20%; H, 9.63%; N, 4.62%.
Found: C, 74.90%; H, 10.11%; N, 4.86%.
Mass spectrum:
Calculated molecular weight 303. M⁺ 303.
NMR spectrum (in CCl₄ solution):
τ
2.75 (2H) and 3.04 (2H) (-C₆H₄-),
6.19 (2H,

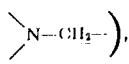), 7.73 (3H, singlet,

):

8-Aza-8-(p-chlorobenzyl)-7,7,9,9-tetramethyl-1,4-dioxa-spiro[4.5]decane;

White crystals melting at 125° – 126°C. [recrystallization from petroleum benzine].
Analysis for C₁₈H₂₆NO₂Cl:
Calculated: C, 66.76%; H, 8.09%; N, 4.32%.
Found: C, 66.60%; H, 7.92%; N, 4.52%.
Mass spectrum:
Calculated molecular weight 323. M⁺ 323.
NMR spectrum (in CCl₄ solution):
τ
2.65 (2H) and 2.85 (2H) (—C₆H₄—),
6.20 (2H,

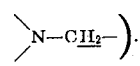.

EXAMPLE 7

1,2,2,6,6-Pentamethyl-4,4-(o-phenylenedioxy)piperidine

A mixture of 8.3 g. of 2,2,6,6-tetramethyl-4,4-(o-phenylenedioxy)piperidine, 5 g. of methyl iodide and 5 ml. of ether was stirred at room temperature for 2 days.

Then, the reaction mixture was filtered to separate out the hydroiodide crystals precipitated in situ. The crystals were washed with ether.

The ether washings and the filtrate were combined and from the resulting mixture was distilled off the solvent. The residue was chromatographed by means of an alumina column and petroleum ether as an eluent. The eluate so obtained was concentrated to give 3.3 g. of the desired product as white crystals melting at 46° – 47°C.
Analysis for C₁₆H₂₃NO₂:
Calculated: C, 73.53%; H, 8.87%; N, 5.36%.
Found: C, 73.73%; H, 8.94%; N, 5.30%.
Mass spectrum:
Calculated molecular weight 261. M⁺ 261.
NMR spectrum (in CCl₄ solution):
τ
3.35 (4H, —C₆H₄—),
7.70 (3H, singlet,

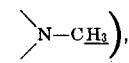), 8.81 (12H, singlet, —CH₃ at 2- and 6-positions).

EXAMPLE 8

(1,2,2,6,6-Pentamethylpiperidine)-4-spiro-2'-(1',3',10',12'-tetraoxacyclooctadecane)-11'-spiro-4''-(1'',2'',2'',6'',6''-pentamethylpiperidine)

A mixture of 1.5 g. of (2,2,6,6-tetramethylpiperidine)-4-spiro-2-(1',3',10',12'-tetraoxacyclooctadecane)-11''-spiro-4''-(2'',2'',6'',6''-tetramethylpiperidine), 5 g. of methyl iodide and 200 ml. of benzene was heated under reflux for 25 hours. After cooling, the reaction mixture was treated in the same manner as shown in the above Example 1 and the crystalline residue recrystallized from methanol to give the desired product as white crystals melting at 204° – 208°C.
Analysis for C₃₂H₆₂N₂O₄:
Calculated: C, 71.32%; H, 11.60%; N, 5.20%.
Found: C, 71.16%; H, 11.43%; N, 5.42%.
Mass spectrum:
Calculated molecular weight 538. M⁺ 538.
NMR spectrum (in CCl₄ solution):
τ
7.73 (6H, singlet,

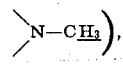, 8.91 (24H, singlet, C—CH₃).

EXAMPLE 9

8-Aza-7,7,8,9,9-pentamethyl-1,4-dioxa-spiro[4.5]decane

To a solution of 20 g. of 8-aza-7,7,9,9-tetramethyl-1,4-dioxa-spiro[4.5]decane in 100 ml. of cyclohexane was added 60 ml. of an 50% aqueous sodium hydroxide solution and to the resulting mixture was added dropwise with stirring 12.6 g. of dimethyl sulfate. After completion of the dropwise-addition, the resulting mixture was stirred at room temperature for additional 4 hours. Then, the solvent was distilled off, the residue was extracted with benzene and the benzene extract was subjected to distillation under reduced pressure to give the desired product as colorless liquid boiling at 90° – 91°C./2 mmHg. The product thus obtained is identified with that in the above Example 1 by means of melting point, analysis, IR spectrum, NMR spectrum and mass spectrum.

EXAMPLE 10

8-Aza-8-(β-hydroxyethyl)-7,7,9,9-tetramethyl-1,4-dioxa-spiro[4.5]decane

A methanolic solution of 8 g. of 8-aza-7,7,9,9-tetramethyl-1,4-dioxa-spiro[4.5]decane, 0.4 ml. of hydrochloric acid and 20 g. of ethylene oxide were sealed into a tube and the sealed tube was heated at 60°C. for 3 hours. After cooling, the tube was opened and the reaction mixture was concentrated. The residue was then extracted with benzene and the benzene extract was subjected to distillation under reduced pressure to give the desired product as colorless liquid boiling at 110° – 115°C./2 mmHg., which was ice-cooled to give white crystals melting at 52° – 53°C.
Analysis for C₁₃H₂₅NO₃:
Calculated: C, 64.16%; H, 10.36%; N, 5.76%.
Found: C, 64.22%; H, 10.18%; N, 5.80%.

Mass spectrum:
 Calculated molecular weight 243. M⁺ 243.
NMR spectrum (in CCl₄ solution):
τ
 6.60 (2H, triplet,

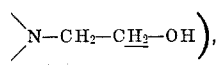

), 7.35 (2H, triplet,

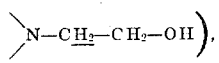

), 7.48 (1H, broad, —OH).

EXAMPLE 11

8-(β-Acetoxyethyl)-8-aza-7,7,9,9-tetramethyl-1,4-dioxa-spiro[4.5]decane

To a solution of 3.6 g. of 8-aza-8-(β-hydroxyethyl)-7,7,9,9-tetramethyl-1,4-dioxa-spiro[4.5]decane in 15 ml. of benzene was added 2.1 g. of potassium carbonate and to the resulting mixture was added with stirring 1.2 g. of acetyl chloride. Then, the resulting mixture was heated under reflux for 1.5 hours.

The reaction mixture was washed with water, dried over anhydrous sodium sulfate and the solvent was distilled off. The residue was recrystallized from petroleum ether to give the desired product as white crystals melting at 35° – 36°C.

Analysis for $C_{15}H_{27}NO_4$:
 Calculated: C, 63.13%; H, 9.54%; N, 4.91%.
 Found: C, 63.33%; H, 9.62%; N, 4.99%.
IR spectrum (Nujol mull):
 $\nu_{C=O}$ 1748 cm⁻¹
Mass spectrum:
 Calculated molecular weight 285. M⁺ 285.

Following the substantially same procedures as shown above, the following esters were produced:

8-aza-8-(β-decanoyloxyethyl)-7,7,9,9-tetramethyl-1,4-dioxa-spiro[4.5]decane:

Colorless oily substance boiling at 178° – 180°C./0.15 mmHg.
Analysis for $C_{23}H_{43}NO_4$:
 Calculated: C, 69.84%; H, 10.90%; N, 3.52%.
 Found: C, 70.10%; H, 10.94%; N, 3.69%.
IR spectrum (liquid film):
 $\nu_{C=O}$ 1740 cm⁻¹.
Mass spectrum:
 Calculated molecular weight 397. M⁺ 397.

8-(β-acryloyloxyethyl)-8-aza-7,7,9,9-tetramethyl-1,4-dioxa-spiro[4.5]decane

Colorless oily substance boiling at 143° – 144°C./1 mmHg.
Analysis for $C_{16}H_{27}NO_4$:
 Calculated: C, 64.62%; H, 9.15%; N, 4.71%.
 Found: C, 64.34%; H, 9.17%; N, 4.62%.
IR spectrum (liquid film):
 $\nu_{C=O}$ 1735 cm⁻¹.
Mass spectrum:
 Calculated molecular weight 297. M⁺ 297.

8-aza-8-(β-crotonyloxyethyl)-7,7,9,9-tetramethyl-1,4-dioxa-spiro[4.5]decane

Colorless oily substance boiling at 163° – 165°C./1 mmHg.
Analysis for $C_{17}H_{29}NO_4$:
 Calculated: C, 65.56%; H, 9.39%; N, 4.50%.
 Found: C, 65.28%; H, 9.40%; N, 4.49%.
IR spectrum (liquid film):
 $\nu_{C=O}$ 1730 cm⁻¹
Mass spectrum:
 Calculated molecular weight 311. M⁺ 311.

8-aza-8-(β-benzoyloxyethyl)-7,7,9,9-tetramethyl-1,4-dioxa-spiro[4.5]decane

White crystals melting at 77° – 78°C.
Analysis for $C_{20}H_{29}NO_4$:
 Calculated: C, 69.13%; H, 8.41%; N, 4.03%.
 Found: C, 69.22%; H, 8.45%; N, 3.99%.
Mass spectrum:
 Calculated molecular weight 347. M⁺ 347.

EXAMPLE 12

Into 100 parts of polypropylene ["Noblen JHH-G," trade name, available from Mitsui Toatsu Chemicals Inc., Japan, employed after twice recrystallizations from monochlorobenzene] was incorporated 0.25 part of each of the test compounds of this invention indicated below. The resulting mixture was mixed and melted and then molded into a sheet having a thickness of 0.5 mm. under heating and pressure.

As a control, the polypropylene sheet was prepared in a similar manner to that described above without any of stabilizers for comparative purpose.

Then, all of these sheets thus formed were tested for the brittleness time (which means the time, expressed in terms of hour, until the test sheet will become brittle) under ultraviolet ray irradiation at a temperature of 45°C. by means of the fade meter prescribed in Japanese Industrial Standard JIS-1044 entitled "Testing Method of Color Fastness to Light of Dyed Textiles and Dyestuff," Paragraph 3.8 (in English).

The results are given in the following Table 1.

Table 1

| Test compound No. | Brittleness time (hours) |
|---|---|
| 1 | 520 |
| 2 | 440 |
| 4 | 340 |
| 5 | 480 |
| 6 | 500 |
| 7 | 220 |
| 8 | 260 |
| 9 | 460 |
| 10 | 360 |
| 11 | 520 |
| 12 | 300 |
| 13 | 320 |
| 14 | 460 |
| 15 | 440 |
| 16 | 360 |
| 17 | 420 |
| None | 80 |

EXAMPLE 13

Into 100 parts of high-density polyethylene ["Hi-Zex," trade name, available from Mitsui Toatsu Chemicals Inc., Japan, employed after twice recrystallizations from toluol] were incorporated 0.25 part of each of the test compounds of this invention indicated below. The resulting mixture was made into a sheet by the same procedure as in the above Example 12.

The sheet thus formed was tested for the brittleness time by the same test method as in the above Example 12. The results are given in the following Table 2.

Table 2

| Test compound No. | Brittleness time (hours) |
|---|---|
| 1 | 880 |
| 2 | 720 |
| 4 | 700 |
| 5 | 860 |
| 6 | 920 |
| 7 | 640 |
| 8 | 680 |
| 9 | 840 |
| 10 | 740 |
| 11 | 980 |
| 12 | 620 |
| 13 | 660 |
| 14 | 820 |
| 15 | 820 |
| 16 | 740 |
| 17 | 780 |
| None | 380 |

EXAMPLE 14

Into 100 parts of 6-nylon ["CM 1011," trade name, available from Toray Industries Inc., Japan, containing no stabilizer] was incorporated 0.25 part of each of the test compounds of this invention indicated below. The resulting mixture was heated and melted and then molded into a film having a thickness of about 0.1 mm. under pressure. The film thus formed was aged under the following aging condition and thereafter subjected to a tensile test to determine the retentions of ultimate tensile strength and ultimate elongation by a standard method.

Aging test
1. Exposure to ultraviolet ray for 300 hours in the fade meter described above at 45°C.
2. Aging at 160°C. for 2 hours in a Geer's aging tester prescribed in Japanese Industrial Standard JIS-K-6301 entitled "Physical Testing Methods for Vulcanized Rubber," Paragraph 6.5 (in English).

The results are given in the following Table 3.

Table 3

| Test compound No. | Fade meter (after 300 hours) | | Geer's aging tester (2 hours, 160°C.) | |
|---|---|---|---|---|
| | Retention of ultimate elongation (%) | Retention of ultimate tensile strength(%) | Retention of ultimate elongation (%) | Retention of ultimate tensile strength(%) |
| 1 | 57 | 54 | 54 | 57 |
| 4 | 52 | 55 | 59 | 58 |
| 6 | 60 | 59 | 58 | 56 |
| 8 | 51 | 53 | 48 | 51 |
| 11 | 61 | 65 | 60 | 59 |
| 13 | 57 | 53 | 51 | 59 |
| 14 | 62 | 57 | 63 | 62 |
| 15 | 59 | 57 | 61 | 55 |
| 16 | 55 | 55 | 54 | 51 |
| 17 | 59 | 61 | 50 | 52 |
| None | 8 | 40 | 9 | 52 |

EXAMPLE 15

Into 100 parts of polyurethane prepared from polycaprolactone ["E-5080," trade name, available from The Nippon Elastollan Industries Ltd., Japan] was incorporated 0.5 part of each of the test compounds of this invention indicated below. The resulting mixture was heated and melted and then molded into a sheet having a thickness of about 0.5 mm. The sheet thus formed was subjected to the exposure to ultraviolet ray for 15 hours in the fademeter as specified in the above Example 12 at 45°C. and then tested for the retentions of ultimate elongation and ultimate tensile strength as in the above Example 14.

The results are given in the following Table 4.

Table 4

| Test compound No. | Retention of ultimate elongation(%) | Retention of ultimate tensile strength(%) |
|---|---|---|
| 4 | 83 | 85 |
| 6 | 87 | 81 |
| 8 | 76 | 79 |
| 11 | 88 | 84 |
| 14 | 89 | 87 |
| 15 | 83 | 85 |
| 17 | 91 | 82 |
| None | 71 | 54 |

EXAMPLE 16

Into 100 parts of polyvinyl chloride ["Geon 103 EP," trade name, available from The Japanese Geon Co. Ltd., Japan] were incorporated 1.0 part of lead stearate, 0.5 part of dibasic lead phosphite, 0.5 part of barium stearate, 0.5 part of cadmium stearate and 0.2 part of each of the test compounds of this invention indicated below. The resulting mixture was blended and kneaded for 4 minutes on a kneading roll at 180°C. and then formed into a sheet having a thickness of about 0.5 mm. The sheet was tested for the discoloration degree thereof by the aging test method set forth below.

Aging test
1. Exposure to the sunshine carbon apparatus prescribed in Japanese Industrial Standard JIS Z-0230 entitled "Accelerated Weathering test of Rust Proofing Oils," Paragraph 2 for 600 hours.
2. The sheet was aged for 90 minutes at 170°C. in the Geer's aging tester prescribed in the above Example 14. The results are given in the following Table 5.

Table 5

| Test compound No. | Discoloration Sunshine carbon apparatus (after 600 hours) | Geer's aging tester (after 90 minutes, 170°C.) |
| --- | --- | --- |
| 4 | Pale yellow | Pale yellow |
| 6 | do. | Yellow |
| 8 | Yellow | do. |
| 11 | Slightly yellowish | Pale yellow |
| 14 | Pale yellow | do. |
| 16 | Yellow | Yellow |
| 17 | do. | do |
| None | Dark brown | Black |

EXAMPLE 17

Into 100 parts of acrylonitrile-butadiene-styrene-resin ["ABS-60," trade name, available from The Japan Synthetic Rubber Co. Ltd., Japan] were incorporated 0.5 part of each test compound of this invention indicated below. The resulting mixture was blended and kneaded for 8 minutes on a kneading roll at 160°C. and formed into a sheet having a thickness of about 0.5 mm. The sheet was exposed for 50 hours in the sunshine carbon apparatus specified in the above Example 16 and then tested for the retentions of ultimate elongation and ultimate tensile strength as in the above Example 14.

The results are given in the following Table 6.

Table 6.

| Test compound No. | Retention of ultimate elongation (%) | Retention of ultimate tensile strength (%) |
| --- | --- | --- |
| 4 | 58 | 87 |
| 6 | 57 | 89 |
| 8 | 57 | 85 |
| 11 | 59 | 88 |
| 14 | 60 | 86 |
| 16 | 62 | 89 |
| 17 | 58 | 87 |
| None | 44 | 79 |

It will be apparent from the above-described results that N-substituted piperidine derivatives (I) of this invention show excellent stabilizing effects against deterioration of various synthetic polymers.

PREPARATION 1

8-Aza-7,7,9,9-tetramethyl-1,4-dioxa-spiro[4.5]decane

Into a solution of 23.4 g. of triacetonamine in 150 ml. of benzene were added 83 g. of ethylene glycol and 30 g. of p-toluenesulfonic acid and the resulting mixture was heated under reflux for 18 hours by means of a water separator.

Then, the reaction mixture was poured into a cold aqueous solution of sodium hydroxide and the benzene layer was separated therefrom. The layer so separated was washed with water, dried over anhydrous sodium sulfate and subjected to distillation under reduced pressure to give the desired product as colorless liquids boiling at 103.5° – 104.5°C/3.4 mmHg.
IR (liquid film)
$\nu_{C-O-C}$ 1091, 1040 cm$^{-1}$ Analysis for $C_{11}H_{21}NO_2$:
Calculated: C, 66.29%; H, 10.62%; N, 7.03%.
Found: C, 66.39%; H, 10.74%; N, 6.98%.
Molecular weight (Osmometer)
Calculated: 119.29
Found: 205.7

PREPARATION 2

4,4-(o-Phenylenedioxy)-2,2,6,6-tetramethylpiperidine

The substantially same procedure as shown in the above Preparation 1 was repeated except that catechol was employed instead of the ethylene glycol to give the desired product as colorless liquids boiling at 118° – 120°C./3 mmHg.

Upon being allowed to cool, the liquids solidified and recrystallization from aqueous methanol gave white crystals melting at 74° – 75°C.
IR (Nujol mull)
$\nu_{C-O-C}$ 1098, 1064 cm$^{-1}$
Out-of-plane deformation absorption of the O-disubstituted benzene ring 730 – 800 cm$^{-1}$
Analysis for $C_{15}H_{21}NO_2$:
Calculated: C, 72.84%; H, 8.56%; N, 5.66%.
Found: C, 72.73%; H, 8.71%; N, 5.90%.

PREPARATION 3

(2,2,6,6-Tetramethylpiperidine)-4-spiro-2'-(1',3',10',12'-tetraoxacyclooctadecane)-11'-spiro-4''-(2'',2'', 6'', 6''-tetramethylpiperidine)

The substantially same procedures as shown in the above Preparation 1 was repeated except that 62 g. of triacetonamine, 25 g. of hexamethylene glycol and 78 g. of p-toluenesulfonic acid were employed.

After completion of the reaction, the reaction mixture was poured into a cold aqueous solution of sodium hydroxide, the benzene layer was separated and washed with water. After drying over anhydrous sodium sulfate, the solvent was distilled off and the residue recrystallized from methanol to give the desired product as colorless prisms melting at 187° – 188°C.
Analysis for $C_{30}H_{58}N_2O_4$:
Calculated: C, 70.54%; H, 11.45%; N, 5.48%.
Found: C, 70.37%; H, 11.45%; N, 5.61%.
Mass spectrum:
Calculated molecular weight 510. M$^+$ 510.
NMR spectrum (in CCl$_4$ solution):
$\tau$
6.64 (8H, —CH$_2$— adjacent to O),
8.38 (8H, singlet, —CH$_2$— in piperidine ring),
8.60 (16H, broad, —CH$_2$),
8.85 (24H, singlet, —CH$_3$).
IR spectrum (liquid film):
$\nu_{C-O-C}$ 1091, 1042 cm$^{-1}$.

What is claimed is:
1. A compound having the formula

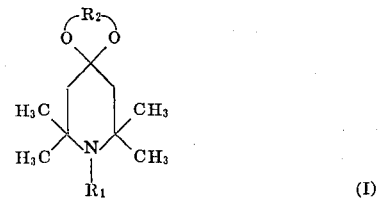

(I)

wherein R$_1$ represents an alkyl group of 1 – 8 carbon atoms, an alkenyl group of 3 – 5 carbon atoms, an alkynyl group of 3 – 5 carbon atoms, a benzyl group which may be substituted with alkyl of 1 to 3 carbon atoms or halogen, phenethyl group, naphthylmethyl group, β-hydroxyethyl group or a group of the formula

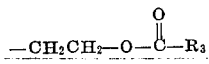

in which $R_3$ is an alkyl group of 1 to 10 carbon atoms, an alkenyl group of 3 – 5 carbon atoms, phenyl group or naphthyl group; and $R_2$ represents an alkylene group having 2 or 3 carbon atoms, o-phenylene group or the group of the formula

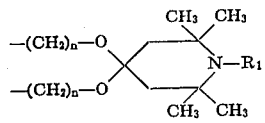
(I-a)

in which $R_1$ is as defined above and n is an integer of 4 through 6 inclusive.

2. A compound having the formula

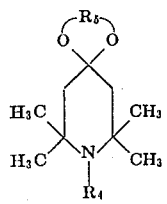
(1-a)

wherein $R_4$ represents an alkyl group of 1 – 8 carbon atoms, an alkenyl group of 3 – 5 carbon atoms an alkynyl group of 3 to 5 carbon atoms, a benzyl group which may be substituted with alkyl of 1 to 3 carbon atoms or halogen, phenethyl group of naphthylmethyl group; and $R_5$ represents an alkylene group of 2 or 3 carbon atomes, o-phenylene group or a group of the formula

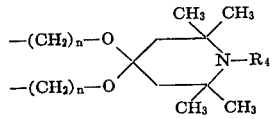

in which $R_4$ is as defined above and n is an integer of 4 through 6 inclusive.

3. A compound having the formula

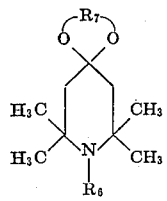
(I-b)

wherein $R_6$ represents an alkyl group of 1 – 8 carbon atoms; and $R_7$ represents an alkylene group having 2 or 3 carbon atoms, o-phenylene group or the group of the formula

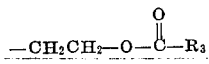

in which $R_6$ is as defined above and n is an integer of 4 through 6 inclusive.

4. A compound having the formula

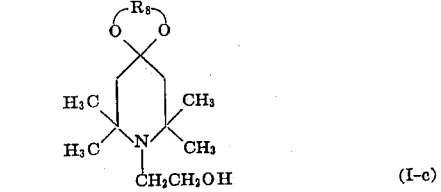
(I-c)

wherein $R_8$ represents an alkylene group having 2 or 3 carbon atoms, o-phenylene group or the group of the formula

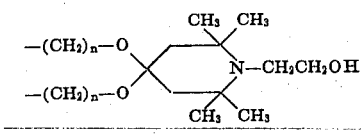

in which $n$ is an integer of 4 through 6 inclusive.

5. A compound having the formula (I-d)

wherein $R_3$ represents an alkyl group of 1 – 8 carbon atoms, an alkenyl group of 3 – 5 carbon atoms, phenyl group, or naphthyl group; and $R_9$ represents an alkylene group having 2 or 3 carbon atoms, o-phenylene group or the group of the formula in which $R_3$ is as defined above and $n$ is an integer of 4 through 6 inclusive.

6. 8-Aza-8-(β-hydroxyethyl)-7,7,9,9-tetramethyl-1,4-dioxa-spiro[4.5]decane.

7. 8-Aza-8-benzyl-7,7,9,9-tetramethyl-1,4-dioxa-spiro[4.5]-decane.

8. 1,2,2,6,6-Pentamethyl-4,4-(o-phenylenedioxy)-piperidine.

9. 8-Aza-8-(β-decanoyloxyethyl)-7,7,9,9-tetramethyl-1,4-dioxa-spiro[4.5]decane.

10. 8-(β-Acryloyloxyethyl)-8-aza-7,7,9,9-tetramethyl-1,4-dioxa-spiro[4.5]decane.

* * * * *